United States Patent
Bae

(10) Patent No.: US 9,628,537 B2
(45) Date of Patent: Apr. 18, 2017

(54) HIGH PICTURE QUALITY VIDEO STREAMING SERVICE METHOD AND SYSTEM

(71) Applicant: SK PLANET CO., LTD, Seongnam-si, Gyeonggi-do (KR)

(72) Inventor: Tae Meon Bae, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/159,694

(22) Filed: May 19, 2016

(65) Prior Publication Data
US 2016/0269465 A1 Sep. 15, 2016

Related U.S. Application Data

(63) Continuation of application No. 14/113,445, filed as application No. PCT/KR2012/003316 on Apr. 27, 2012, now Pat. No. 9,374,408.

(30) Foreign Application Priority Data

Jun. 24, 2011 (KR) ........................ 10-2011-0061688

(51) Int. Cl.
*H04N 19/172* (2014.01)
*H04L 29/06* (2006.01)
(Continued)

(52) U.S. Cl.
CPC .......... *H04L 65/607* (2013.01); *H04L 65/604* (2013.01); *H04N 19/172* (2014.11);
(Continued)

(58) Field of Classification Search
CPC ............. H04L 21/2439; H04L 29/2337; H04L 29/234; H04L 65/607
See application file for complete search history.

(56) References Cited

U.S. PATENT DOCUMENTS 8,743,954 B1 * 6/2014 Masterson ........... H04N 19/154
375/240.05
2011/0246616 A1 * 10/2011 Ronca .............. H04N 21/26258
709/219

(Continued)

FOREIGN PATENT DOCUMENTS

JP 2007195146 8/2007
KR 1020020095001 A 12/2002

(Continued)

OTHER PUBLICATIONS

International Search Report mailed Nov. 7, 2012 corresponding to International Application No. PCT/KR2012/003316.

*Primary Examiner* — Nicholas Taylor
*Assistant Examiner* — Afroza Sultana
(74) *Attorney, Agent, or Firm* — Hauptman Ham, LLP

(57) ABSTRACT

The present invention relates to a high picture quality video streaming service method and system. The high picture quality video streaming service system according to the present invention includes: a content server for generating a first encoding video by encoding an original video with at a constant bit rate, generating a second encoding video by encoding the original video by using 1/N of the length of a first encoding video Group Of Pictures (GOP) and 1/N of a frame rate with constant Quantization Parameters, generating a streaming video by using the first encoding video and the second encoding video, and downloading the first encoding video and transmitting the streaming video in real time; and a user terminal for downloading and playing the first encoding video, or generating and playing a video for playback by recombining frames of the first encoding video and frames of the streaming video.

11 Claims, 9 Drawing Sheets

(51) Int. Cl.
*H04N 21/2343* (2011.01)
*H04N 21/462* (2011.01)
*H04N 19/177* (2014.01)

(52) U.S. Cl.
CPC ..... *H04N 19/177* (2014.11); *H04N 21/23439* (2013.01); *H04N 21/4622* (2013.01)

(56) References Cited

U.S. PATENT DOCUMENTS

| | | | | |
|---|---|---|---|---|
| 2011/0268178 | A1* | 11/2011 | Park | H04N 21/23439 375/240.02 |
| 2012/0144444 | A1* | 6/2012 | Hunt | H04N 21/8456 725/115 |
| 2012/0169829 | A1* | 7/2012 | Wei | H04N 7/142 348/14.07 |
| 2012/0317189 | A1* | 12/2012 | Einarsson | H04L 65/4084 709/203 |

FOREIGN PATENT DOCUMENTS

| | | |
|---|---|---|
| KR | 1020050087837 A | 8/2005 |
| WO | 2005071969 A1 | 8/2005 |

* cited by examiner

HIGH PICTURE QUALITY VIDEO STREAMING SERVICE METHOD AND SYSTEM

CROSS-REFERENCE TO RELATED APPLICATIONS

The present application is a continuation of U.S. patent application Ser. No. 14/113,445 filed Oct. 23, 2013, which is the National Phase application of International Application No. PCT/KR2012/003316, filed Apr. 27, 2012, which is based upon and claims the benefit of priorities from Korean Patent Application No. 10-2011-0061688, filed on Jun. 24, 2011. The disclosures of the above-listed applications are hereby incorporated by reference herein in their entirety.

TECHNICAL FIELD

The present invention relates to a method and system for streaming high picture quality video content and, more particularly, to a high picture quality video streaming service method and system, wherein a user can download video content within a short time and streaming service can be provided to a user based on already downloaded video content when streaming service for video content is provided to the user, thereby being capable of providing high picture quality video content using downloaded video content even when streaming service is provided.

BACKGROUND ART

In general, in media streaming technology, multimedia data captured from a camcorder in real time is encoded by an encoder, and the encoded multimedia data is transmitted to the media player of a terminal in the form of a multimedia stream which operates on the UDP/IP and RTP/RTCP layers of a media server and is compressed by a codec over wired and wireless Internet networks in a streaming manner under the control of a Real Time Streaming Protocol (RTSP).

Here, the streaming service method is a method using a temporal characteristic of the multimedia data and is a method of playing back received data while continuously receiving a small amount of data over a network without downloading all data at once through the terminal. The streaming service method is a method suitable for providing long-time content as compared with a download method.

Furthermore, in a streaming service method, a Realtime Transfer Protocol (RTP) is now defined as a standard for streaming when a server sends a compressed video over a network so that a terminal can play back the video in real time. A transport method using an HTTP or an FTP is also used in the streaming service method. Video encoding technology in which the size of a video is reduced by compressing video data when streaming the video is being used.

Meanwhile, a method of a user playing back a video in a terminal includes a method of downloading video content and playing back the downloaded video content, a method of receiving video content through Internet streaming and playing back the received video content as described above, and so on. Video download service is problematic in that the time that is taken for a user to download video content is long, and streaming service is problematic in that it is difficult to sufficiently increase picture quality of a transmitted video due to limited real-time transport.

DISCLOSURE

Technical Problem

An object of the present invention for solving the aforementioned problems is to provide a high picture quality video streaming service method and system, wherein a user can download video content within a short time and streaming service can be provided to a user based on already downloaded video content when streaming service for video content is provided to the user, thereby being capable of providing high picture quality video content to the user even when streaming service is provided.

Technical Solution

In accordance with an aspect of the present invention for achieving the object, a high picture quality video streaming service system includes a content server for generating a first encoding video by encoding the original video at a constant bit rate, generating a second encoding video by encoding the original video having a constant quantization parameter in 1/N of a length of a Group Of Picture (GOP) and at 1/N of a frame rate of the first encoding video, generating a streaming video using the first encoding video and the second encoding video, downloading the first encoding video, and transmitting the streaming video in real time and a user terminal for downloading the first encoding video and playing back the downloaded first encoding video or generating a video for playback by recombining frames of the first encoding video and frames of the streaming video and playing back the generated video for playback.

In accordance with another aspect of the present invention, a content server includes a first encoding unit for generating a first encoding video by encoding the original video at a constant bit rate, a second encoding unit for setting a Group Of Picture (GOP) and a frame rate so that a second encoding video is encoded in 1/N of the length of a GOP and at 1/N of the frame rate of the first encoding video and generating the second encoding video by encoding the original video with a quantization parameter constant for the entire original video, a streaming video generation unit for generating a streaming video using the first encoding video and the second encoding video, a video download unit for downloading the first encoding video, and a video streaming unit for transmitting the streaming video in real time.

Here, the streaming video generation unit compares frames of the first encoding video with frames of the second encoding video and generates a reserved streaming video by selecting a frame of the first encoding video if frames are identical with each other and selecting one of a frame of the first encoding video and a frame of the second encoding video if the frames are not identical with each other.

Furthermore, the streaming video generation unit predicts structural similarity values when transmitting a frame of the first encoding video and a frame of the second encoding video as the streaming video and generates the reserved streaming video by selecting the frame of the first encoding video if a difference between the predicted structural similarity values is a threshold or lower and selecting the frame of the second encoding video if a difference between the predicted structural similarity values exceeds the threshold.

Furthermore, the streaming video generation unit generates the streaming video by removing a frame identical with the frames of the first encoding video from frames of the reserved streaming video.

In accordance with yet another aspect of the present invention, a user terminal includes a video download unit for downloading a first encoding video, a video streaming unit for receiving a streaming video in real time, a playback video generation unit for generating a video for playback using the first encoding video and the streaming video, and a video playback unit for playing the first encoding video or playing back the video for playback.

Furthermore, the playback video generation unit compares frames of the first encoding video with frames of the streaming video, selects a frame of the first encoding video if the frame of the first encoding video is included only in the first encoding video, selects a frame of the streaming video if the frame of the streaming video is included in the first encoding video and the streaming video, and generates the video for playback by recombining the selected frames.

In accordance with yet another aspect of the present invention, a high picture quality video streaming service method of a content server includes the steps of (a) generating a first encoding video and a second encoding video by encoding the original video at different Group Of Pictures (GOP) and different frame rates, (b) generating a streaming video using the first encoding video and the second encoding video, and (c) downloading the first encoding video and transmitting the streaming video in real time.

Here, the step (a) includes generating the first encoding video by encoding the original video at a constant bit rate, a first Group Of Picture (GOP), and a first frame rate and generating the second encoding video by encoding the original video having a constant quantization parameter in 1/N of the length of the first GOP and at 1/N of the first frame rate.

Furthermore, the step (b) includes the steps of (b-1) comparing frames of the first encoding video with frames of the second encoding video and generating a reserved streaming video by selecting a frame of the first encoding video if frames are identical with each other and selecting one of a frame of the first encoding video and a frame of the second encoding video if the frames are not identical with each other and (b-2) generating the streaming video by removing a frame identical with the frames of the first encoding video from frames of the reserved streaming video.

Furthermore, the step (b-1) includes predicting structural similarity values when transmitting a frame of the first encoding video and a frame of the second encoding video as the streaming video and generating the reserved streaming video by selecting the frame of the first encoding video if a difference between the predicted structural similarity values is a threshold or lower and selecting the frame of the second encoding video if a difference between the predicted structural similarity values exceeds the threshold.

In accordance with yet another aspect of the present invention, a high picture quality video streaming service method of a user terminal includes (a) downloading a first encoding video and receiving a streaming video in real time, (b) generating a video for playback using the first encoding video and the streaming video, and (c) playing back the video for playback.

Here, the step (b) includes comparing frames of the first encoding video with frames of the streaming video, selecting a frame of the first encoding video if the frame of the first encoding video is included only in the first encoding video, selecting a frame of the streaming video if the frame of the streaming video is included both in the first encoding video and the streaming video, and generating the video for playback by recombining the selected frames.

Advantageous Effects

As described above, the high picture quality video streaming service method and system of the present invention are advantageous in that they can provide high picture quality video streaming service at a low data transfer rate using a downloaded video while providing download service for a video at high speed.

MODE FOR INVENTION

Figure 1:
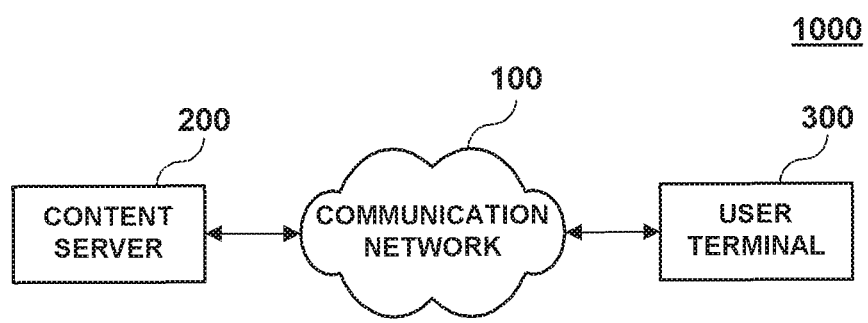
FIG. 1 is a construction diagram showing an embodiment of a high picture quality video streaming service system in accordance with an aspect of the present invention.

The present invention may be modified in various ways and may be implemented to have several embodiments. Specific embodiments are illustrated in the drawings and are described in detail. It is however to be noted that the present invention is not intended to be limited to the specific embodiments of the present invention, but it is to be understood that the specific embodiments include all modifications, equivalents to substitutions which fall within the spirit and technical scope of the present invention.

Embodiments of a high picture quality video streaming service method and system according to the present invention are described in detail with reference to the accompanying drawings. In describing the embodiments with reference to the accompanying drawings, the same or corresponding elements are assigned the same reference numerals, and a redundant description thereof is omitted.

High Picture Quality Video Streaming Service System

FIG. 1 is a construction diagram showing an embodiment of a high picture quality video streaming service system in accordance with an aspect of the present invention.

The high picture quality video streaming service system 1000 in accordance with an aspect of the present invention, as shown in FIG. 1, includes a content server 200, a user terminal 300, and a communication network 100.

The content server 200 generates a video for high-speed download (hereinafter used as the same meaning as a 'first encoding video') by encoding the original video at a constant bit rate, generates a video for high picture quality (hereinafter used as the same meaning as a 'second encoding video') by encoding the original video having a constant quantization parameter in 1/N of the length of the Group Of Picture (GOP) of the first encoding video and at 1/N of the frame rate of the first encoding video, generates a streaming video using the first encoding video and the second encoding video, downloads the first encoding video, and transmits the streaming video in real time.

The first encoding video is a video encoded from the original video for high-speed download at a constant bit rate, and the second encoding video is a video encoded from the original video in the state in which picture quality of the original video remains constant for streaming.

The second encoding video encoded for streaming is encoded such that the length of a GOP of the second encoding video is 1/N times and a frame rate thereof is 1/N times, as compared with the first encoding video encoded for high-speed download. Preferably, N may be set to 2.

The user terminal 300 downloads the first encoding video and plays back the downloaded first encoding video or generates a video for playback by recombining frames of the first encoding video and frames of the streaming video and plays back the generated video.

That is, the user terminal 300 downloads a video for high-speed download, that is, the first encoding video, stores or plays back the downloaded video or recombines a streaming video received in real time with a video for high-speed download and plays back the recombined video as a video for streaming playback.

The communication network 100 can include a mobile communication network, such as CDMA, WCDMA, or HSPA, a wired communication network, such as the Internet and a PSTN, and a local area communication network, such as Bluetooth or Zigbee.

Content Server

Figure 2:
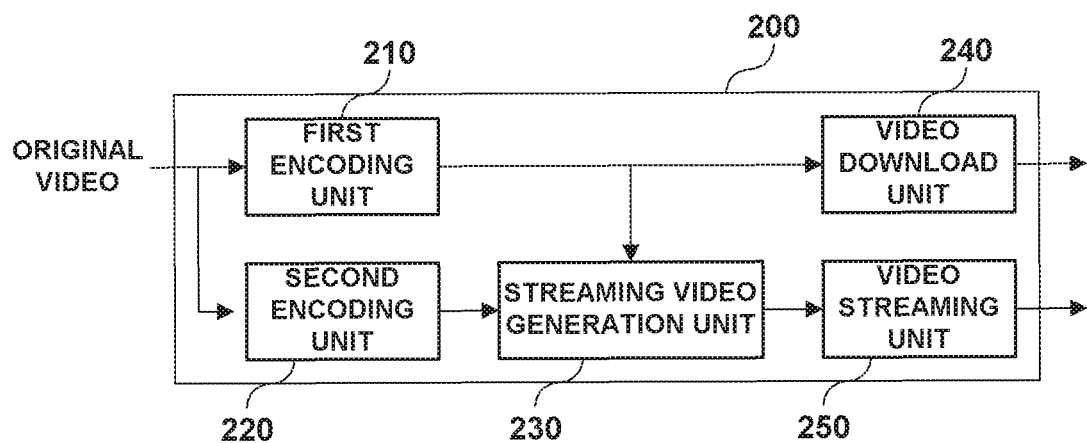
FIG. 2 is a construction diagram showing an embodiment of a content server in accordance with another aspect of the present invention.

FIG. 2 is a construction diagram showing an embodiment of the content server in accordance with another aspect of the present invention.

The content server 200 is configured to include a first encoding unit 210, a second encoding unit 220, a streaming video generation unit 230, a video download unit 240, and a video streaming unit 250, as shown in FIG. 2.

The first encoding unit 210 generates a first encoding video encoded from the original video at a constant bit rate.

The first encoding unit 210 generates a video for high-speed download by encoding the original video at a constant bit rate so that a video encoded at a constant bit rate can be transmitted.

The second encoding unit 220 sets the length of a GOP and a frame rate of the original video such that the original video is encoded in 1/N of the length of the GOP of the first encoding video and at 1/N of the frame rate of the first encoding video and encodes the original video in the state in which a quantization parameter is constant in the entire original video.

The second encoding unit 220 encodes the original video so that picture quality of all videos remain constant using a quantization parameter value for the entire original video as a constant value in order to generate a video for high picture quality.

The streaming video generation unit 230 generates a streaming video using the first encoding video encoded by the first encoding unit 210 and the second encoding video encoded by the second encoding unit 220.

The streaming video generation unit 230 compares the frames of the first encoding video with the frames of the second encoding video and generates a reserved streaming video by selecting the frames of the first encoding video, that is, a video for high-speed download if the frames are identical with each other and selecting one of the frames of the first encoding video and the frames of the second encoding video if the frames are not identical with each other.

The streaming video generation unit 230 predicts structural similarity (SSIM) values for frames that are not identical with each other when transmitting frames of the first encoding video and frames of the second encoding video as a streaming video and generates a reserved streaming video by selecting the frames of the first encoding video if a difference between the predicted SSIM values is a threshold or lower and selecting the frames of the second encoding video if a difference between the predicted SSIM values exceeds the threshold.

The streaming video generation unit 230 generates a streaming video by removing the same frame as that of the first encoding video from the frames of the reserved streaming video.

For example, if the second encoding video has been encoded such that the GOP and frame rate of the second encoding video become ½ of the GOP and frame rate of the first encoding video, the streaming video generation unit 230 forms a reserved streaming video by selecting frames of the first encoding video in the case of the same ½ frames because ½ of all the frames is the same as those of the first encoding video when comparing each of the frames of the first encoding video with each of the frames of the second encoding video.

The streaming video generation unit 230 predicts a difference between SSIM values of ½ frames that are not identical with each other when the first encoding video and the second encoding video are transmitted as a streaming video, compares the predicted difference between the SSIM values with a threshold, and forms a reserved streaming video by selecting frames of the first encoding video if the difference between the SSIM values is the threshold or lower and selecting frames of the second encoding video if the difference between the SSIM values exceeds the threshold.

In accordance with the aforementioned process, the streaming video generation unit 230 forms a reserved streaming video and finally generates a streaming video by removing the same frame as that of the first encoding video from the frames of the reserved streaming video.

The video download unit 240 downloads the first encoding video (i.e., a video for high-speed download), and the video streaming unit 250 transmits the streaming video to the user terminal 300 in real time.

User Terminal

Figure 3:
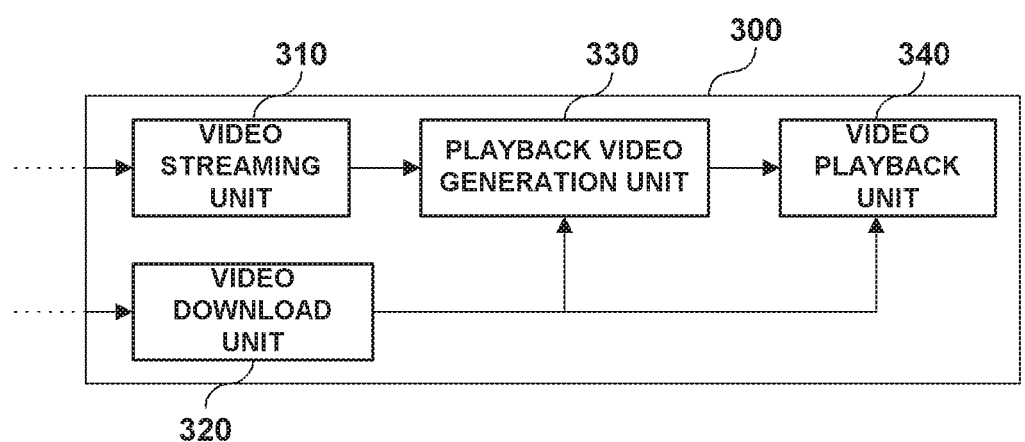
FIG. 3 is a construction diagram showing an embodiment of a user terminal in accordance with yet another aspect of the present invention.

FIG. 3 is a construction diagram showing an embodiment of the user terminal in accordance with yet another aspect of the present invention.

The user terminal 300 is configured to include a video streaming unit 310, a video download unit 320, a playback video generation unit 330, and a video playback unit 340, as shown in FIG. 3.

The video streaming unit 320 receives a streaming video in real time, and the video download unit 320 downloads a first encoding video.

The playback video generation unit 330 of the user terminal 300 can generate a video for playback by combining the downloaded first encoding video with the streamed streaming video and thus can play back a video for high picture quality as a video for playback using the downloaded first encoding video in advance.

More particularly, the playback video generation unit 330 compares the frames of the first encoding video and the frames of the streaming video, selects the frames of the first encoding video if the frame is included only in the first encoding video, selects the frames of the streaming video if the frame is included both in the first encoding video and the streaming video, and generates a video for playback by recombining the selected frames.

The video playback unit 340 plays back the first encoding video downloaded at high speed or plays back the video for playback generated by recombining the downloaded first encoding video and the streamed streaming video.

High-Picture Quality Video Streaming Service Method of Content Server

Figure 4:
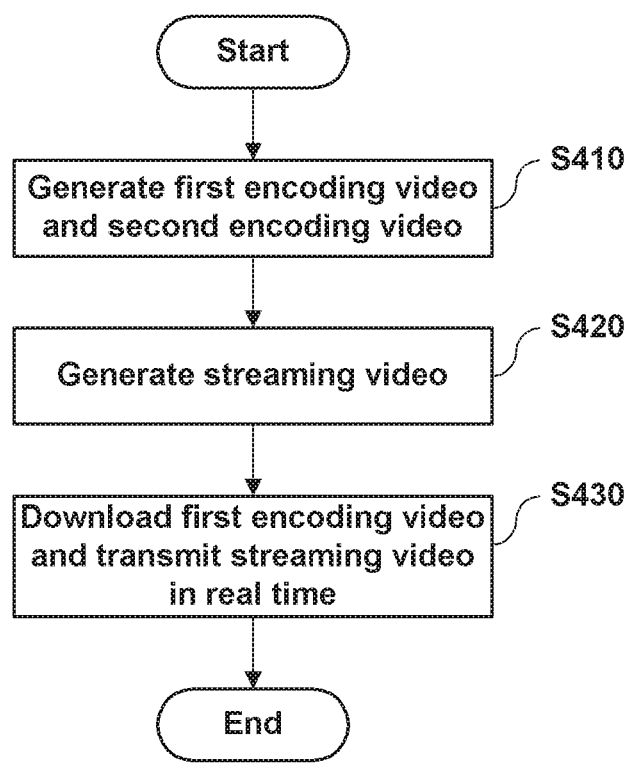
FIG. 4 is a flowchart illustrating a high picture quality video streaming service method of the content server in accordance with yet another aspect of the present invention.
Figure 5:
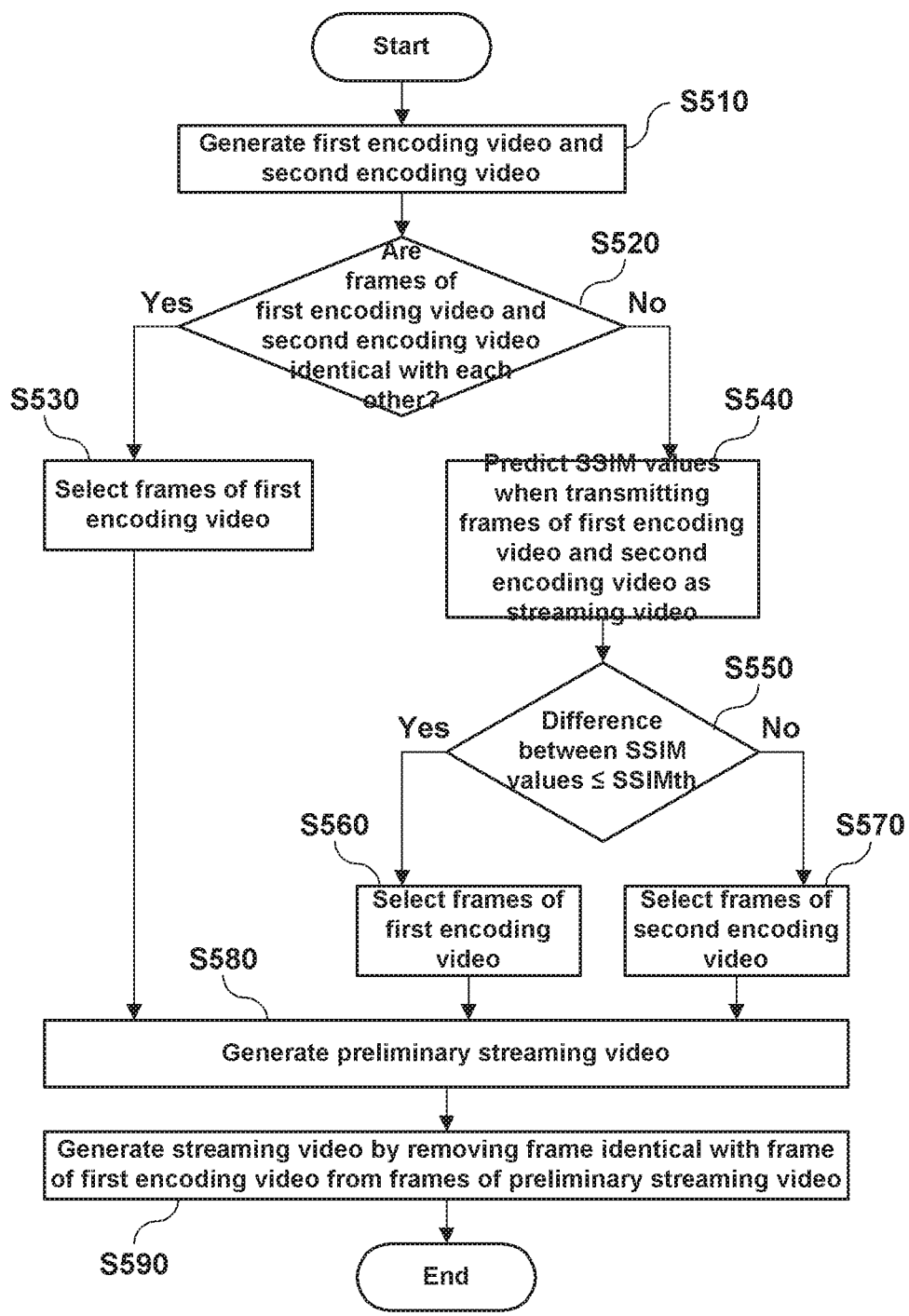
FIG. 5 is a detailed flowchart illustrating a process of generating a streaming video in the high picture quality video streaming service method of the content server in accordance with yet another aspect of the present invention.

FIG. 4 is a flowchart illustrating a high picture quality video streaming service method of the content server in accordance with yet another aspect of the present invention, and FIG. 5 is a detailed flowchart illustrating a process of generating a streaming video in the high picture quality video streaming service method of the content server in accordance with yet another aspect of the present invention.

The high picture quality video streaming service method of the content server of the present invention includes, as shown in FIG. 4, generating a first encoding video and a second encoding video (S410), generating a streaming video (S420), and downloading the first encoding video and transmitting the streaming video in real time (S430).

Here, the step (S410) of generating the first encoding video and the second encoding video includes encoding the original video at different Group Of Pictures (GOPs) and different frame rates. The first encoding video, that is, a video for high-speed download, and the second encoding video, that is, a video for high picture quality streaming, are generated by encoding the original video using differently set encoding parameters.

More particularly, the first encoding video is generated by encoding the original video at a constant bit rate, at a first GOP, and a first frame rate, and the second encoding video is generated by encoding the original video having a constant quantization parameter in 1/N of the length of the first GOP and at 1/N of the first frame rate.

Next, the generation (S420) of the streaming video is performed by selecting, removing, or recombining some frames of the first encoding video and the second encoding video. A detailed process of generating the streaming video is described with reference to FIG. 5.

Finally, the first encoding video, that is, a video for high-speed download, is downloaded onto the user terminal, and the streaming video generated by recombining the first encoding video and the second encoding video is transmitted to the user terminal in a real-time streaming manner.

The process of generating a streaming video in the high picture quality streaming service method of the content server is embodied below. As shown in FIG. 5, the process includes a process (S510) of generating a first encoding video and a second encoding video and a process (S520~S590) of generating a streaming video.

First, the process of generating a streaming video includes comparing the frames of the first encoding video with the frames of the second encoding video in order to determine whether or not the frames of the first encoding video and the second encoding video are identical with each other (S520).

Here, the same frame means that the frames of the original video are identical with each other and means that the frames of the first encoding video and the second encoding video have been encoded under different conditions.

If, as a result of the comparison, the frames are identical with each other, frames of the first encoding video are selected (S530). If the frames are not identical with each other, SSIM values of the first and the second encoding videos when they are transmitted as a streaming video are predicted and compared with a threshold (S540 to S570).

That is, a preliminary streaming video is generated by selecting frames of the first encoding video, that is, a video for high-speed download (S530), if the frames of the original video of frames of the first encoding video are identical with the frames of the original video of frames of the second encoding video and selecting one of frames of the first encoding video, that is, a video for high-speed download, and frames of the second encoding video, that is, a video for high picture quality download, (S540 to S570) if the frames of the original videos are not identical with each other.

If the frames of the original videos are not identical with each other, SSIM values when transmitting the frames of the first encoding video and the second encoding video as a streaming video are predicted (S540), and a difference between the predicted SSIM values is compared with a threshold (S550).

If, as a result of the comparison, a difference between the SSIM values is the threshold or lower, frames of the first encoding video are selected (S560). If a difference between the SSIM values exceeds the threshold, frames of the second encoding video are selected (S570).

A preliminary streaming video is generated by gathering the selected frames of the first encoding video or the selected frames of the second encoding video (S580).

Finally, a streaming video to be streamed and transmitted in real time is generated by removing the same frame as that of the first encoding video from the frames of the preliminary streaming video (S590).

High-Picture Quality Video Streaming Service Method of User Terminal

Figure 6:
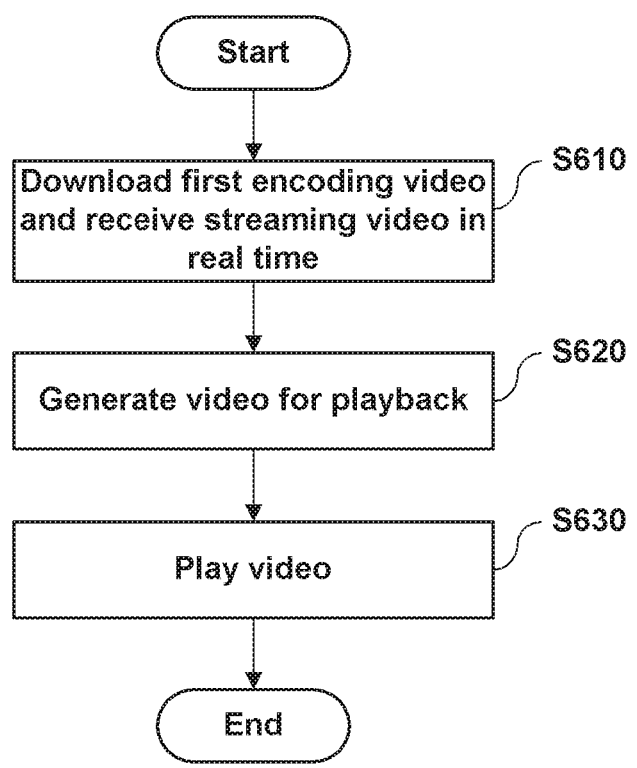
FIG. 6 is a flowchart illustrating a high picture quality video streaming service method of the user terminal in accordance with yet another aspect of the present invention.
Figure 7:
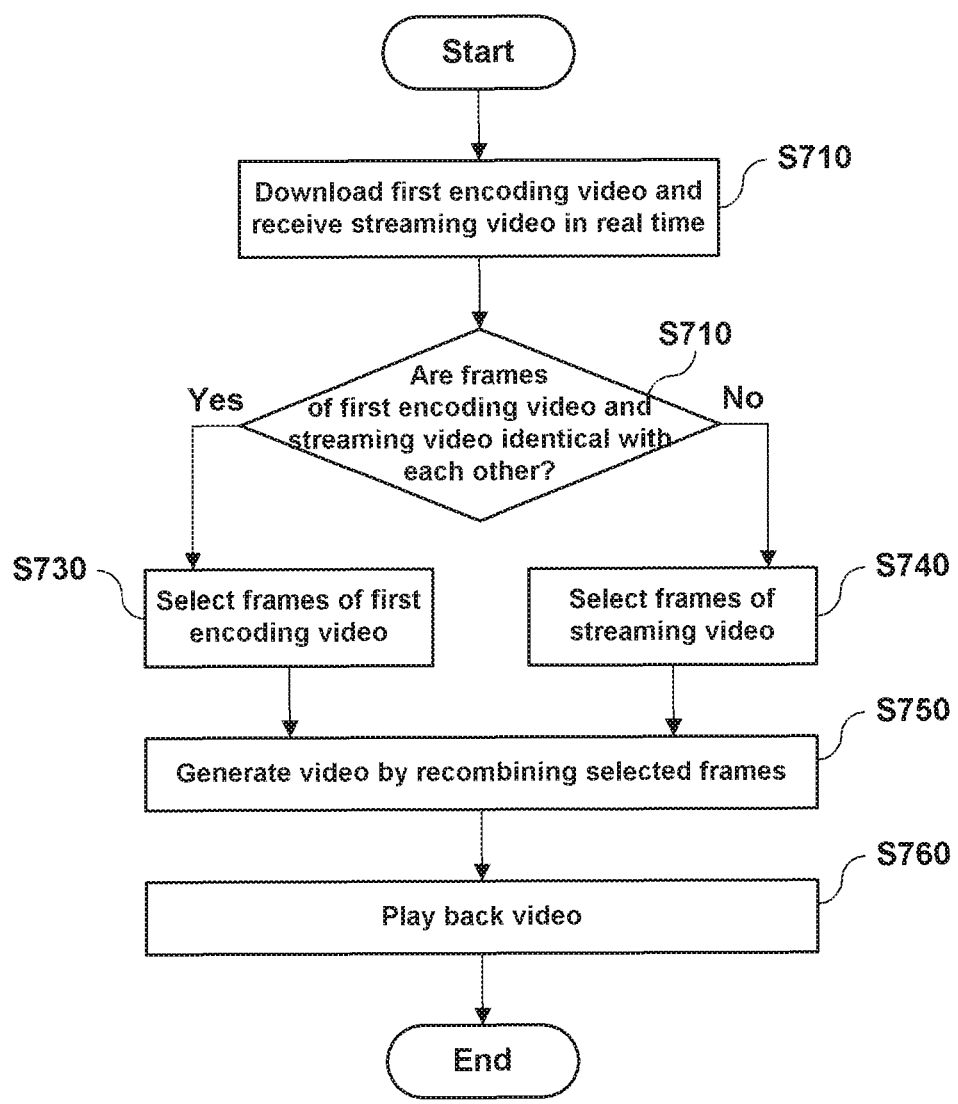
FIG. 7 is a detailed flowchart illustrating a process of generating a video for playback in the high picture quality video streaming service method of the user terminal in accordance with yet another aspect of the present invention.

FIG. 6 is a flowchart illustrating a high picture quality video streaming service method of the user terminal in accordance with yet another aspect of the present invention, and FIG. 7 is a detailed flowchart illustrating a process of generating a video for playback in the high picture quality video streaming service method of the user terminal in accordance with yet another aspect of the present invention.

The high picture quality video streaming service method of the user terminal includes, as shown in FIG. 6, downloading a first encoding video and receiving a streaming video in real time (S610), generating a video for playback by recombining the first encoding video and the streaming video (S620), and playing back a video for playback (S630).

The process of generating a video for playback in the high picture quality streaming service method of the user terminal is configured to include a process (S710) of downloading a first encoding video and receiving a streaming video in real time, a process (S720~S750) of generating a video for playback by recombining the first encoding video and the streaming video, and a process (S760) of playing back the video for playback, as shown in FIG. 7.

Here, the process of generating the video for playback includes comparing the frames of the first encoding video with the frames of the streaming video in order to determine whether or not the frames of the first encoding video and the streaming video are identical with each other (S720). Whether or not the frames of the first encoding video and the streaming video are identical with each other is determined by comparing the frames of the original videos of the first encoding video and the streaming video with each other.

If, as a result of the comparison, the same frame is included only in the first encoding video, frames of the first encoding video are selected (S730). If the same frame is included both in the first encoding video and the streaming video, frames of the streaming video are selected (S740).

That is, a playback video is generated by commonly selecting the first encoding video as a playback video, but additionally selecting frames of the streaming video in relation to frames transmitted as the streaming video.

Accordingly, high picture quality video streaming service can be provided because frames of a higher picture quality video for high-speed download than a real-time streamed video can be used as a video for playback.

Next, a video for playback is generated by combining the selected frames (S750), and the generated video for playback is played back (S760).

A process of the content server generating a streaming video and the user terminal generating a video for streaming playback is described in more detail with reference to FIGS. 8 and 9.

Figure 8:
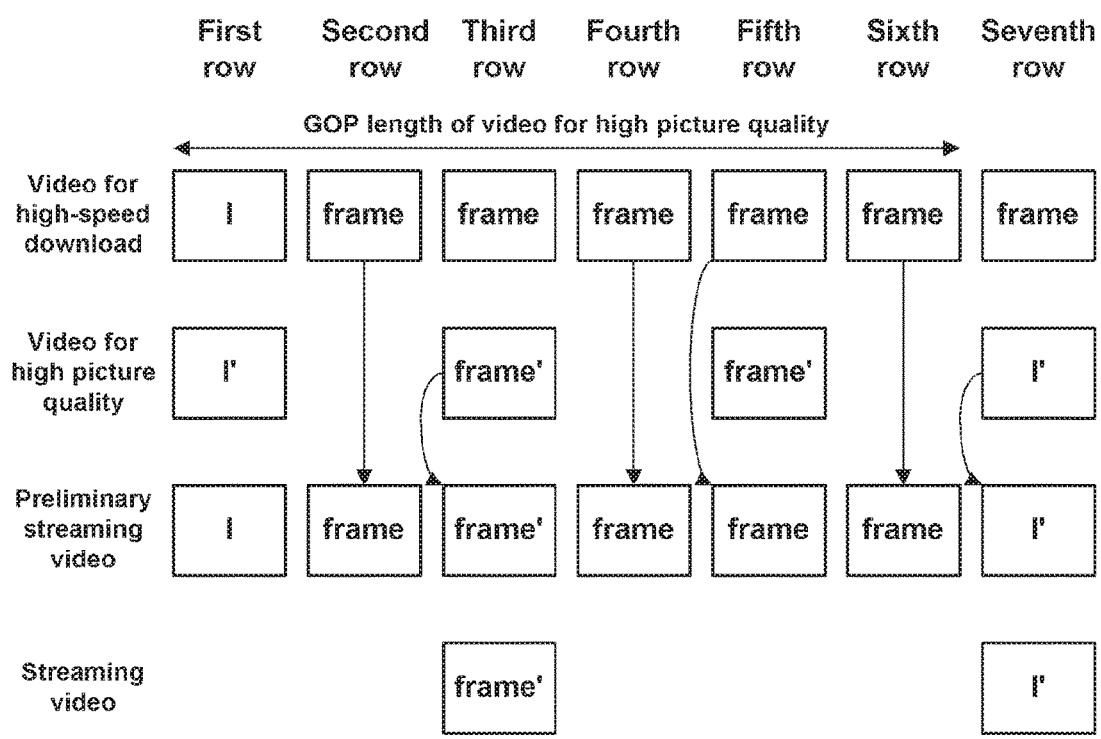
FIG. 8 is a diagram illustrating an embodiment in which a streaming video is generated in the high picture quality video streaming service method of the content serve in accordance with yet another aspect of the present invention.
Figure 9:
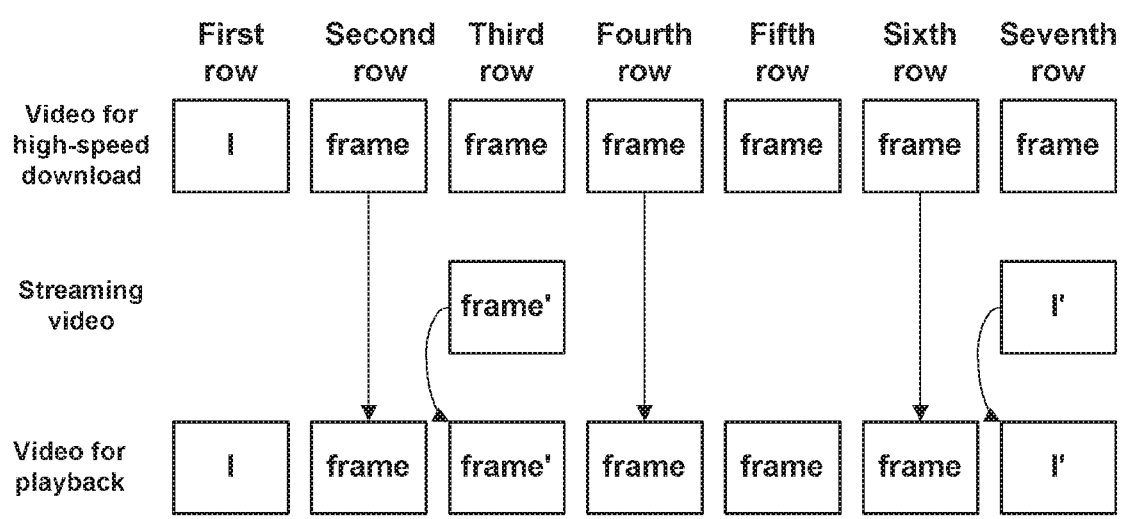
FIG. 9 is a diagram illustrating an embodiment in which a video for streaming playback is generated in the high picture quality video streaming service method of the user terminal in accordance with yet another aspect of the present invention.

FIG. 8 is a diagram illustrating an embodiment in which a streaming video is generated in the high picture quality video streaming service method of the content serve in accordance with yet another aspect of the present invention, and FIG. 9 is a diagram illustrating an embodiment in which a video for streaming playback is generated in the high picture quality video streaming service method of the user terminal in accordance with yet another aspect of the present invention.

FIGS. 8 and 9 are diagrams illustrating a process of generating a streaming video using a video for high-speed download and a video for high picture quality when the video for high picture quality is encoded at ½ of the length of the GOP of the video for high-speed download and at ½ of the frame rate of the video for high-speed download and a process of generating a playback video using the video for high-speed download and the streaming video.

The generation of the streaming video includes, as shown in FIG. 8, includes generating, by the content server, a preliminary streaming video, by combining the video for high-speed download and the video for high picture quality and generating a streaming video by excluding the same frame as that of the video for high-speed download from the preliminary streaming video.

First, the frames of the video for high-speed download are compared with the frames of the video for high picture quality. Frames of the video for high-speed download, corresponding to the same frames in 2, 4, and 6 rows, are selected as a preliminary streaming video.

Regarding frames in 1, 3, 5, and 7 rows which are not identical with each other as a result of the comparison between the frames of the video for high-speed download with the frames of the video for high picture quality, a difference between SSIM values when the video for high-speed download and the video for high picture quality are streamed and transmitted is predicted and then compared with a threshold.

The 1 and 5 rows correspond to a case where the frames of the video for high-speed download have been selected as a preliminary streaming video and where a difference between the SSIM values is the threshold or lower. The 3 and 7 rows correspond to a case where the frames of the video for high picture quality have been selected as a preliminary streaming video and where a difference between the SSIM values exceeds the threshold.

When the preliminary streaming video is generated by comparing each of the frames of the video for high-speed download with each of the frames of the video for high picture quality, a streaming video is generated by removing frames of the video for high-speed download from the preliminary streaming video.

The video for high-speed download is downloaded independently from the streaming video. After the video for high-speed download is downloaded, the downloaded video is removed from the streaming video because the video for high-speed download can be used in the user terminal.

The playback video is generated by the user terminal using a video for high-speed download and a streaming video, as shown in FIG. 9.

First, the frames of the streaming video are compared with the frames of the video for high-speed download. Frames of the video for high-speed download, corresponding to frames in 1, 2, 4 to 6 included only in the frames of the video for high-speed download, are selected. A playback video is generated by selecting frames of the streaming video, corresponding to frames included both in the video for high-speed download and the streaming video.

That is, in order to generate a playback video, the user terminal basically uses the frames of a video for high-speed download which has been previously downloaded and generates the playback video using only frames, transmitted as a streaming video, as the streaming video additionally.

As described above, in accordance with the present invention, a user can download video content within a short time, and the user can be provided with streaming service based on already downloaded video content when being provided with streaming service for video content. Accordingly, high picture quality video content can be provided even when streaming service is provided.

Although an exemplary client-server system is illustrated in this specification, the embodiment of a functional operation described in this specification may be embodied in a different type of a digital electronic circuit from that described in this specification, or a structure disclosed in this specification and computer software, firmware, or hardware including structural equivalents thereof, or one or more combinations of them. An embodiment of the subject that is described in the present invention can be embodied as one or more computer program products, in other words, as one or more modules regarding a computer program command that has been encoded on a program storage medium in order to control the operation of a processing system or to execute the computer program command on the processing system. A computer-readable medium may be a machine-readable storage device, a machine-readable storage substrate, a memory device, a composition of materials that affect a machine-readable electromagnetic type signal, or one or more combinations of them.

The terms "processing system", "processing device", and "lower system" cover, for example, all pieces of equipment, devices, and machines for processing data, including a programmable processor, a computer, a multiple processor, or a computer. The processing system can include, for example, code that forms processor firmware, a protocol stack, and code that forms an execution environment for a computer program when a database management system, an operating system, or one or more combinations of them are requested, in addition to hardware.

A computer program (also known as a program, software, a software application, a script, or code) can be written in any type of a programming language that includes a compiled or interpreted language or transcendental procedural language and can also be exploded in any type including an independent program or module, a component, a subroutine, or other units suitable for being used in a computer environment. The computer program does not need to necessarily correspond to a file of a file system. The program can be stored within a single file provided to a requested program, within multiple files that interface with each other (e.g., a file that stores one or more modules, a lower program, or part of code), or within part of another program or a file that includes data (e.g., one or more scripts stored in a markup language document). The computer program can be placed in one site or distributed into a plurality of sites and can be exploded so that the computer program is executed on a single computer or multiple computers coupled together over a communication network.

A computer-readable medium suitable for storing a computer program command and data includes all types of non-volatile memories, mediums, and memory devices, including semiconductor memory devices, such as EPROM, EEPROM, and a flash memory device, magnetic disks, such as an internal hard disk or an external disk, magneto optical disks, CD-ROM disks, and DVD-ROM disk. The processor and the memory can be supplemented by a logic circuit of a special object or can be integrated into a logic circuit of a special object.

An embodiment of the subject described in this specification can include a backend component, such as a data server, can include a middleware component, such as an application server, or can be embodied in an operation system that includes one or more combinations of a frontend component and a backend thereof, and middleware or frontend component, such as a client computer having a web browser or graphic user interface capable of interacting with the embodiment of the subject described by a user in this specification or a backend. The component of a system can be accessed by any type of digital data communication, such as a communication network, or a medium.

Although this specification includes the details of a plurality of specific embodiments, the details should not be construed as being limitative to any invention or a scope that can be claimed, and on the contrary, the details should be construed as being a description of characteristics that may be specific to a specific embodiment of a specific invention. Specific characteristics described in this specification in the context of an individual embodiment may be combined and implemented in a single embodiment. On the contrary, various types of characteristics described in the context of a single embodiment can also be implemented in a plurality of embodiments individually or in any proper lower combination. Although characteristics may operate in a specific combination and the characteristics may be initially depicted as claimed, one or more characteristics from a claimed combination can be excluded from the combination in some cases, and the claimed combination can be changed into a lower combination or a modification of the lower combination.

Likewise, although operations are depicted in specific order in the drawings, it should not be understood that the operations must be performed in specific order or sequential order shown to obtain a preferred result or all the illustrated operations must be performed. In a specific case, multitasking and parallel processing may be advantageous.

Furthermore, it should not be understood that the separation of various system components of the aforementioned embodiments is necessary in all the embodiments. It should be understood that the aforementioned program components and systems may be integrated into a single software product or packaged into multiple software products.

As described above, those skilled in the art to which the present invention pertains will understand that the present invention may be implemented in other detailed forms without changing the technical spirit or essential characteristics of the present invention. Accordingly, the aforementioned embodiments should not be construed as being limitative, but should be construed as being only illustrative from all aspects. The scope of the present invention is disclosed in the appended claims rather than the detailed description, and it should be understood that all modifications or variations derived from the meanings and scope of the present invention and equivalents thereof are included in the scope of the appended claims.

INDUSTRIAL APPLICABILITY

The present invention can be applied to a system which serves video content to a terminal through download or streaming and can be applied to content synchronization technology and real-time transmission technology for consuming high picture quality content over a network.

Furthermore, the present invention can be applied to technology for reducing the size of video content by compressing the video content in order to store and stream the video content.

Furthermore, the present invention can be applied to a device, system or the like which transmits a video compressed in a server over a network so that the video can be played back in real time.

The invention claimed is:

1. A high picture quality video streaming service system, comprising:
a content server for generating a first encoding video by encoding an original video at a constant bit rate, generating a second encoding video by encoding the original video having a constant quantization parameter in 1/N of a length of a Group Of Picture (GOP) and at 1/N of a frame rate of the first encoding video, generating a streaming video using the first encoding video and the second encoding video, downloading the first encoding video, and transmitting the streaming video in real time; and
a user terminal for downloading the first encoding video and playing back the downloaded first encoding video or generating a video for playback by recombining frames of the first encoding video and frames of the streaming video and playing back the generated video for playback,
wherein the content server predicts structural similarity values when transmitting a frame of the first encoding video and a frame of the second encoding video as the streaming video and generates the preliminary streaming video by selecting the frame of the first encoding video or the second encoding video based on both a difference between the predicted structural similarity values and a threshold.

2. A content server, comprising:
a first encoding unit for generating a first encoding video by encoding an original video at a constant bit rate;
a second encoding unit for setting a Group Of Picture (GOP) and a frame rate so that a second encoding video is encoded in 1/N of a length of a GOP and at 1/N of a frame rate of the first encoding video and generating the second encoding video by encoding the original video with a quantization parameter constant for the entire original video;
a streaming video generation unit for generating a streaming video using the first encoding video and the second encoding video;
a video download unit for downloading the first encoding video; and
a video streaming unit for transmitting the streaming video in real time;
wherein the streaming video generation unit predicts structural similarity values when transmitting a frame of the first encoding video and a frame of the second encoding video as the streaming video and generates the preliminary streaming video by selecting the frame of the first encoding video or the second encoding video based on both a difference between the predicted structural similarity values and a threshold.

3. The content server of claim 2, wherein the streaming video generation unit compares frames of the first encoding video with frames of the second encoding video and generates a preliminary streaming video by selecting a frame of the first encoding video if frames are identical with each other and selecting one of a frame of the first encoding video and a frame of the second encoding video if the frames are not identical with each other.

4. The content server of claim 2, wherein the streaming video generation unit predicts structural similarity values when transmitting a frame of the first encoding video and a frame of the second encoding video as the streaming video and generates the preliminary streaming video by selecting the frame of the first encoding video if the difference between the predicted structural similarity values is the threshold or lower and selecting the frame of the second encoding video if the difference between the predicted structural similarity values exceeds the threshold.

5. The content server of claim 3, wherein the streaming video generation unit generates the streaming video by removing a frame identical with the frames of the first encoding video from frames of the preliminary streaming video.

6. A user terminal, comprising:
a video download unit for downloading a first encoding video;
a video streaming unit for receiving a streaming video in real time;
a playback video generation unit for generating a video for playback using the first encoding video and the streaming video; and
a video playback unit for playing the first encoding video or playing back the video for playback
wherein the user terminal communicates with a content server which predicts structural similarity values when transmitting a frame of the first encoding video and a frame of the second encoding video as the streaming video and generates the preliminary streaming video by selecting the frame of the first encoding video or the second encoding video based on both a difference between the predicted structural similarity values and a threshold.

7. The user terminal of claim 6, wherein the playback video generation unit compares frames of the first encoding video with frames of the streaming video, selects a frame of the first encoding video if the frame of the first encoding video is included only in the first encoding video, selects a frame of the streaming video if the frame of the streaming video is included in the first encoding video and the streaming video, and generates the video for playback by recombining the selected frames.

8. A high picture quality video streaming service method of a content server, comprising steps of:
(a) generating a first encoding video and a second encoding video by encoding an original video at different Group Of Pictures (GOP) and different frame rates;
(b) generating a streaming video using the first encoding video and the second encoding video; and
(c) downloading the first encoding video and transmitting the streaming video in real time;
wherein the content server predicts structural similarity values when transmitting a frame of the first encoding video and a frame of the second encoding video as the streaming video and generates the preliminary streaming video by selecting the frame of the first encoding video or the second encoding video based on both a difference between the predicted structural similarity values and a threshold.

9. The high picture quality video streaming service method of claim 8, wherein the step (a) comprises generating the first encoding video by encoding the original video at a constant bit rate, a first Group Of Picture (GOP), and a first frame rate and generating the second encoding video by encoding the original video having a constant quantization parameter in 1/N of a length of the first GOP and at 1/N of the first frame rate.

10. The high picture quality video streaming service method of claim 8, wherein the step (b) comprises steps of:
(b-1) comparing frames of the first encoding video with frames of the second encoding video and generating a preliminary streaming video by selecting a frame of the first encoding video if frames are identical with each other and selecting one of a frame of the first encoding video and a frame of the second encoding video if the frames are not identical with each other; and
(b-2) generating the streaming video by removing a frame identical with the frames of the first encoding video from frames of the preliminary streaming video.

11. The high picture quality video streaming service method of claim 10, wherein the step (b-1) comprises predicting structural similarity values when transmitting a frame of the first encoding video and a frame of the second encoding video as the streaming video and generating the preliminary streaming video by selecting the frame of the first encoding video if the difference between the predicted structural similarity values is the threshold or lower and selecting the frame of the second encoding video if the difference between the predicted structural similarity values exceeds the threshold.

* * * * *